April 25, 1939.   C. DE L. RICE   2,155,615
ARTICULATED TRAIN
Filed Nov. 7, 1936   3 Sheets-Sheet 1
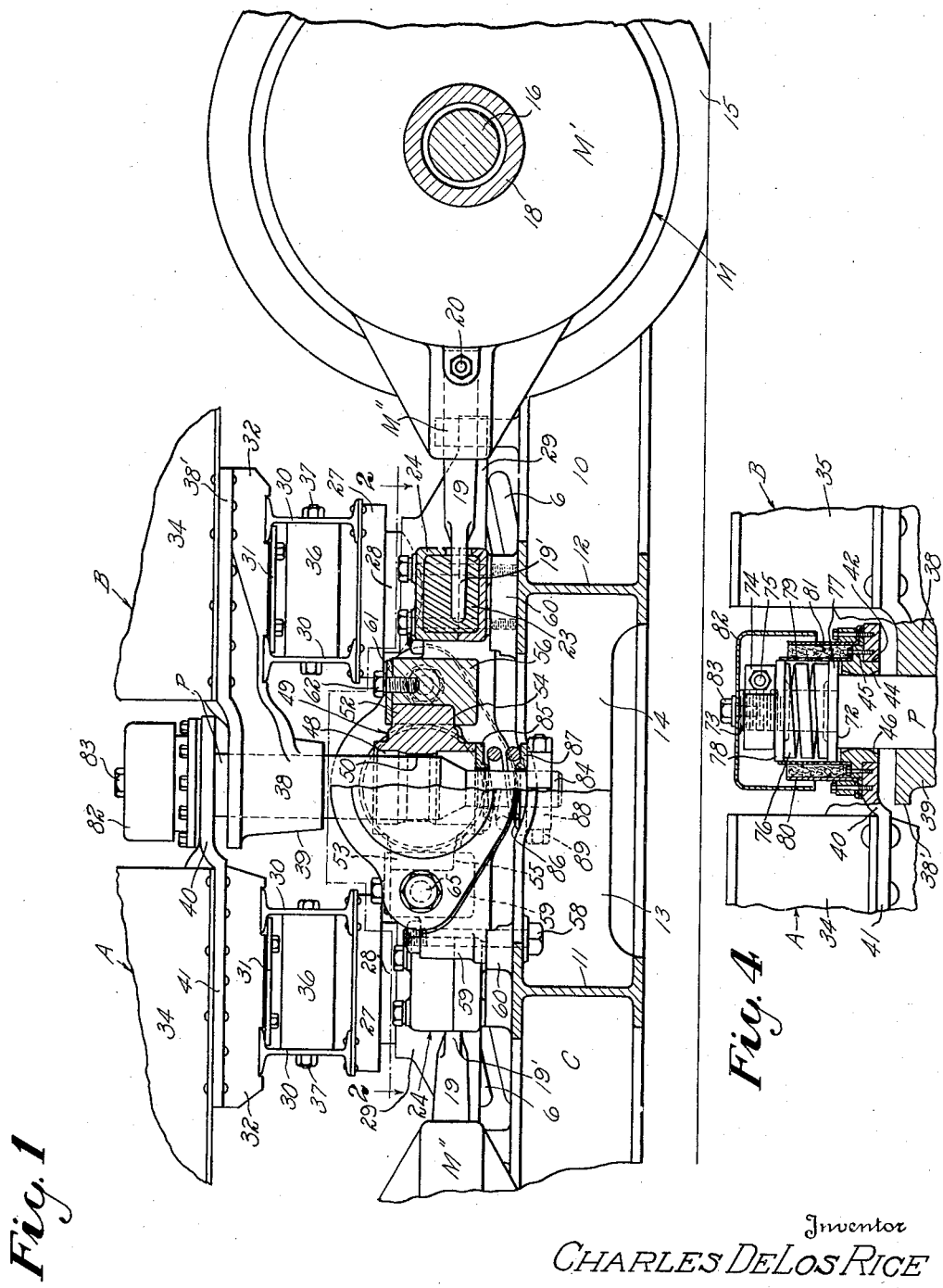
Inventor
CHARLES DE LOS RICE
By W. Clay Lindsey.
Attorney

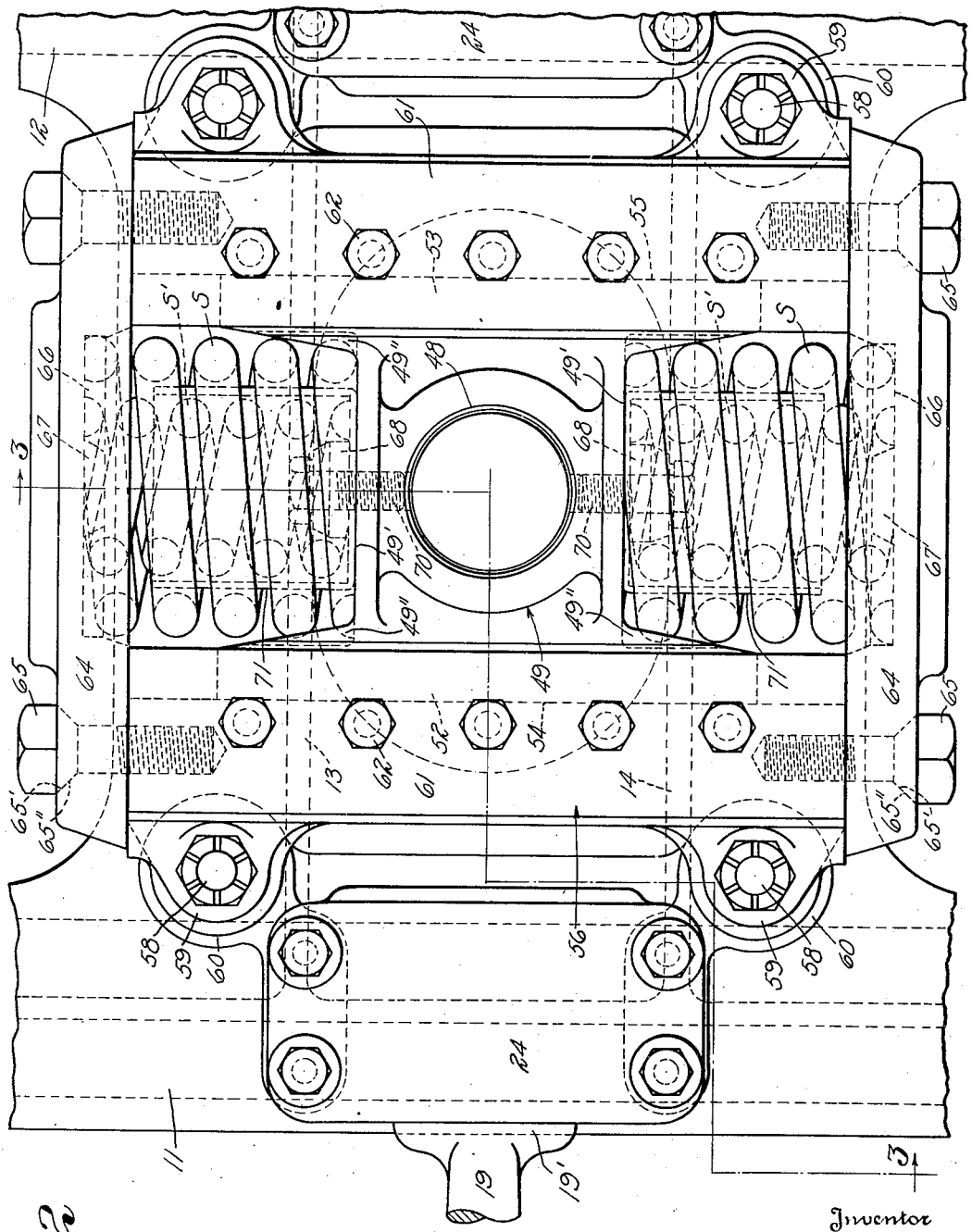

April 25, 1939.  C. DE L. RICE  2,155,615
ARTICULATED TRAIN
Filed Nov. 7, 1936  3 Sheets-Sheet 3
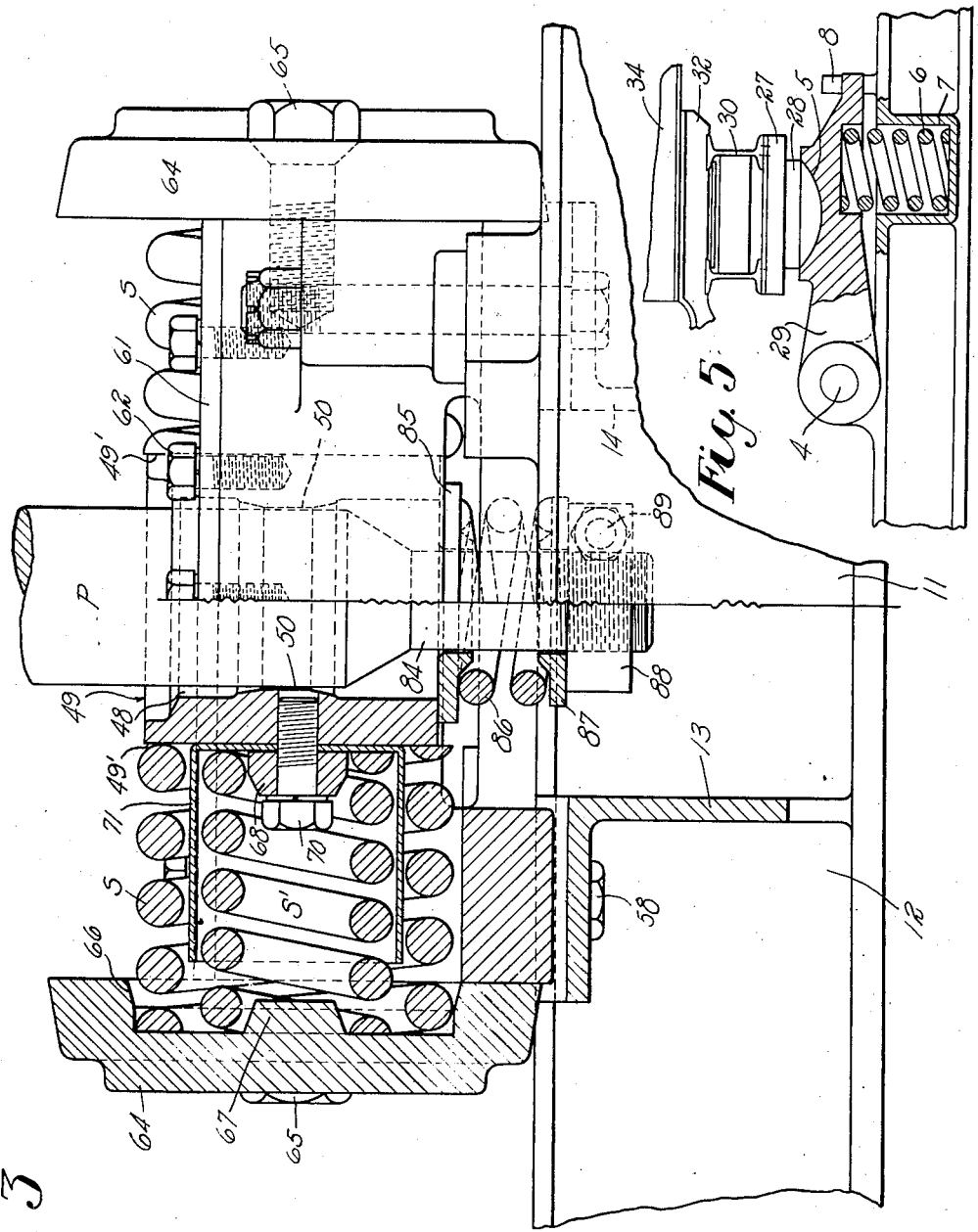
Inventor
CHARLES DeLos RICE
By N. Clay Lindsey
Attorney Patented Apr. 25, 1939

2,155,615

UNITED STATES PATENT OFFICE 2,155,615

ARTICULATED TRAIN

Charles De Los Rice, West Hartford, Conn.

Application November 7, 1936, Serial No. 109,741

5 Claims. (Cl. 105—4)

This invention relates to improvements in railway trains and, more particularly, to a train of the articulated type having two or more coaches or car bodies permanently pivoted together at their adjacent ends and individually supported upon the same truck.

It is an aim of this invention to provide an improved means whereby the adjacent ends of two coaches may be simultaneously supported and pivotally interconnected by the same car truck in such manner that the sidesway movement of the truck in negotiating curves will not tend to be transmitted to the coaches.

It is a further object of the present invention to provide a pivotal interconnection between a coach body and a truck which will permit such movement of the truck relative to the coach that the truck may easily follow any part of the track therefor.

Other objects will be in part obvious and in part pointed out more in detail hereinafter.

The invention accordingly consists in the features of construction, combination of elements and arrangement of parts which will be exemplified in the construction hereinafter set forth and the scope of the application of which will be indicated in the appended claims.

Referring to the drawings, wherein like numerals indicate like parts:

Figure 1 is a fragmentary side elevation of my invention showing a car truck arranged to simultaneously support and pivotally interconnect the adjacent ends of two coaches;

Fig. 2 is an enlarged fragmentary plan view of my invention taken substantially along the line 2—2 of Fig. 1;

Fig. 3 is a view taken substantially along the line 3—3 of Fig. 2;

Fig. 4 is an enlarged sectional view showing the upper support for the pivot pin between adjacent coaches; and Fig. 5 is a somewhat diagrammatic detailed view showing one of the cushioned side bearings for the coach bodies.

In accordance with my invention, I have provided an articulated train, and, more particularly, a truck therefor which is arranged to pivotally connect the adjacent ends of two abutting coaches A and B in such manner that the coaches are individually supported on the truck for free pivotal movement, and side thrusts occasioned by uneven track portions and curves in the track will be resiliently resisted and absorbed between the pivotal truck connection and the truck frame C.

Referring to the illustrated showing of the present invention, I have provided a car truck for an articulated train having a frame C preferably comprising an integral cast steel member including two longitudinally extending side frame members 10 interconnected by rigid cross frame members 11 and 12 substantially H-shaped in cross section. The cross frame members are interconnected and reinforced by webs 13 and 14 disposed longitudinally of the frame and to either side of its axis to aid in supporting a pivot pin connection P, as will be later described.

The truck frame C is supported upon rail wheels, one of which is shown at 15, and the wheels are secured upon axles, one of which is designated at 16. Bearings on the axles are suitably connected to the side frame members 10 in any convenient manner, such, for example, as illustrated in my prior Patent No. 1,987,365, issued January 8, 1935. This truck suspension is not herein illustrated since it does not comprise a part of the present invention. Each axle may be surrounded by a quill 18 suitably connected to the drive wheels and supporting a motor M having an outer casing M' which is restrained from rotation by a laterally extending torque arm 19 substantially radial thereof and mounted at one end within a reinforced protruding portion M'' of the casing, as by a bolt 20. The other end of each arm which projects longitudinally of the truck and towards its mid portion terminates in a flattened end 19' seated within a cushioning member such as a soft rubber block 23 encased within the upper and lower halves of a metal box 24 fastened to the frame.

Each of the car or coach bodies A and B is individually supported for freely cushioned movement upon the truck in such manner that any rocking or twisting movement of one coach will not be transmitted to the other but will be automatically absorbed by a plurality of resilient supports. This arrangement also permits of a limited transverse sliding movement of the car bodies with respect to the truck. Any suitable arrangement may be provided for these purposes, but by way of illustration, I have shown, in Fig. 5, in a more or less diagrammatical manner, a supporting structure which may be employed. It is understood that each corner of the pivotally interconnected coaches will be provided with a side bearing including a block 27 riveted to the bottom flanges of I-beams 30 secured by a clamping plate 31 to frame members 32 which are, in turn, riveted to the under side of longitudinally extending chassis members 34. These chassis members may be in the form of I-beams. Each block 27 slidably rests upon a bearing block 28 which is carried by a rocker arm 29 pivoted to the truck frame, as at 4. The bearing block is mounted in the arm 29 for universal movement and, to this end, the arm has a parti-spherical seat 5, and the under side of the block is matingly curved to fit the seat. This, in effect, gives a ball and socket arrangement. Each of the rocker arms is supported near its outer end by one or more coiled springs 6 located in a well 7 provided in the longitudinally extending side frame member 10, and upstanding members 8 on the truck frame as guides to prevent sidesway of the arm during its rocking movement.

The coaches A and B are pivotally connected by means of pin P which is pivotally and slidably fastened to the truck frame and serves the sole purpose of pivotally interconnecting the abutting coach ends and cushioning the sidesway movement of the coaches without restricting individual rocking movement of the coaches and car truck. Consequently, the truck is free to rock and twist in its following of the track without normally transmitting such movements to the coaches so that the coaches will ride smoothly and be free of jerky sidewise movement. Coach B has a coupling 38 secured therebeneath as by rivets passing through a flanged portion 38' and a bottom flange of I-beams 34. This coupling has an outwardly projecting portion in the general form of a sleeve 33 tightly receiving pin P which forms a substantially integral part therewith.

Coach A has a coupling 40 provided with a horizontal flanged portion 41 secured to the bottom of I-beams 34 as by rivets. Coupling 40 extends outwardly from the ends of I-beams 34 and is provided with a vertical bore 42 extending therethrough and adapted to slidably receive a flanged bearing sleeve 44 rigidly secured thereto as by screws 45. As illustrated in Fig. 4, bearing sleeve 44 has a vertically extending axially convexed hole 46 receiving pin P for free rotational and axially slidable movement therein. The smallest diameter of this convexed hole lies intermediate of its ends so that the bearing and pin may rock and axially slide relative to each other to compensate for the relatively vertical and pivotal movements of coaches A and B.

Pivot pin P is further arranged for a vertical sliding movement and a slight rocking movement within its truck support. To accomplish this, the pin is slidably and axially received intermediate of its ends within the hole 48 of a bearing block 49. Between the ends of this hole is a convexed annular reduced portion 50 of varying diameter and having its smallest diameter intermediate of its ends and slidably receiving pin P, as best illustrated in Fig. 3. The pivot pin is free to slide and rock within this bearing portion 50 in the same manner as the interrelation between the pin P and bearing sleeve 44. Pin P is also supported for a resiliently cushioned vertical movement, as will be later described.

As shown in Fig. 2, bearing block 49 is substantially H-shaped in plan view and provided with spaced laterally extending arms 52 and 53 slidably mounted in spaced parallel ways 54 and 55 extending transversely of the truck frame and formed within a support 56. Support 56, in the present instance, comprises a casting rigidly secured to a saddle portion of the truck frame formed by frame members 11, 12, 13, and 14, by bolts 58 which pass through bosses 59 on the support and bosses 60 extending upwardly from frame C. Cap plates 61 are secured to the top of block 49 by screws 62 and in overlying relation with the respective arms 52 and 53 to form the tops of the ways 54 and 55 and aid in guiding block 49 during its lateral sliding movement. End plates 64 are respectively secured to the end faces of the support at the ends of the ways by screws 65 and serve to limit the extent of lateral sliding movement of block 49.

Block 49 is normally centrally secured on the truck and resiliently cushioned in this position so that it may slidably move in its ways, but will normally return to its central position. To accomplish this, opposed coiled springs are compressively mounted in balanced relation respectively between plates 64 and the body portion of the block between arms 52 and 53 as shown in Fig. 2. These springs cooperate to locate pivot pin P so that, as a train passes around a curve at a high rate of speed, the side thrusts will be yieldably absorbed without transmitting shocks or jars to the coaches and the wheel flanges will not be violently thrust against the sides of the rails with the usual tendency of shearing the rail spikes. In the present instance, a pair of coaxially mounted coiled springs S and S' are located on each side of bearing block 49. Each spring S is located at its outer end within an annular cavity 66 in the respective end plates 64 and at its inner end it is engaged against a substantially flat wall 49' respectively formed on block 49 between reinforcing flanges 49''. The smaller coiled springs S' which are coaxially mounted within springs S are respectively engaged at their outer ends over a tapering hub 67 located centrally of recesses 66, and at their inner ends over hub members 68 coaxial with members 67 and secured to the opposed sides of block 49 as by screws 70.

Cup-shaped guards 71 are preferably secured to bearing block 49 with the bottom portion of each guard located beneath a hub 68 by means of screws 70 so that springs S' are respectively separated through the major portions of their lengths by these cup members, thus preventing any danger of engagement and snarling of the springs in the event that one should become broken. These springs are normally under opposed compressive balanced relation, and it will be evident that by the simple expedient of removing cap plates 64, a single spring or any combination of coiled springs may be inserted to compensate for various differences of weight of coaches and to provide the desired resilient resistance and yieldability to side thrusts. Screws 65 are preferably of sufficient length to pass through plates 64 and threadably engage within support 56 when springs S and S' are extended to their full lengths. If desired, screws 65 may be further provided with conical seating portions 65' engageable with respective seats 65'' in plates 64 to aid in locating the plates in secured position.

Pivot pin P axially slides through bearings 50 and 44 with a resiliently restrained substantially vertical floating movement to aid in preventing shocks and jars from being transmitted between interconnected coaches secured thereto. To accomplish this, the upper end of the pivot pin has a shoulder 72 and terminates thereabove in a reduced portion 73 ending in a screw thread upon which is mounted an adjustable clamping nut 74 locked in position as by a bolt 75 transversely extending therethrough. A coiled spring 76 is mounted over the reduced portion 73 and supported at its lower end by a collar 77 engaging shoulder 72 and having an upwardly projecting spring centering cone. The upper end of the spring resiliently bears against a similar collar 78 engaging nut 74. Under normal conditions, pin P is vertically positioned so that shoulder 72 lies slightly above the top of bearing 44 and collar 77 overhangs the top of this bearing, as shown in Fig. 4. Hence, when the adjacent ends of coaches A and B move in vertical relation to each other, the relative vertical sliding movement of bearing sleeve 44 and spindle P results in abutting engagement of the top of bearing 44 with collar 77 and a consequent compression of spring 76, thereby absorbing any shocks and jars which would normally be transmitted between the interconnected coaches. This vertical cushioning movement may be easily adjusted by means of nut 74.

Spring 76 and collars 77 and 78 are protected from dust and dirt and are lubricated by a flexible sleeve member 79 composed of felt, leather, or other suitable pervious material peripherally engaging collars 77 and 78. A vertically mounted tube 80 of greater diameter than, and surrounding flexible sleeve 79 is provided with a flange at its bottom rigidly secured as by screws to the coupling 40, thus providing an annular well 81 which is filled with a suitable absorbent material such as an oil soaked wicking. The oil within the wicking penetrates through sleeve 79 and provides lubrication for the spring and its associated parts. A packing is preferably provided between the bottom flange of tube 80 and coupling 40 so that the oil within the well will not leak therebetween. The top of spindle P is further provided with a dust cap 82 shaped in the general form of an inverted cup spaced from and surrounding tube 80. This cup is centrally secured to the pin as by a screw 83, and the bottom of the cup is spaced sufficiently above the securing means associated with tube 80 so that the cup does not interfere with the normal vertical movement of pin P.

The lower end of pin P beneath bearing 50 is provided with a reduced portion 84 which slidably receives a flat faced washer 85 spring pressed by means of a coiled spring 86 into slidable frictional engagement with the bottom flat annular face of bearing block 49. The lower end of spring 86 is supported by a similar collar 87 journalled on reduced portion 84 and adjustably secured in position by means of a nut 88 similar to nut 74 and threadably mounted on the lower end of portion 84. Nut 88 is securely clamped in its pre-adjusted position by a clamping bolt 89. Washers 85 and 87 are preferably provided with annular centering cones received within the opposite ends of spring 86 to maintain the spring coaxial with pin P. It will thus be noted that spindle P which is rigidly secured within coupling 38 is freely movable therewith and within the bearings 44 and 50, and the opposed springs 76 and 86 which are initially under compression, serve to cushion the vertical movement of the pin and normally maintain it in a substantially upright position, as illustrated in Figs. 1, 3, and 4. However, these springs will permit the spindle P to angularly rock and vertically move to compensate for irregular truck movements occasioned by rough and uneven portions of track without transmitting said irregular movements to the spindle and interconnected coaches.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In an articulated train comprising a plurality of coaches in tandem relation, a single car truck beneath and individually supporting the abutting ends of a pair of adjacent coaches, a member mounted on the truck, a substantially vertical pin pivotally secured to said member, a pivotal connection between one of the coaches and said pin, a close-fitting connection between the other of said coaches and said pin and means at each end of said pin resiliently supporting it for free floating axial movement relative to the truck and one of the coaches to compensate for vertical movements of one coach relative to the other.

2. In an articulated train comprising a plurality of coaches in tandem relation, a single car truck beneath and individually supporting the abutting ends of a pair of adjacent coaches, a member mounted on the truck, a substantially vertical pivot pin pivotally connected to said member and axially slidable relative thereto, means resiliently supporting said pin for free floating axial movement relative to the member and truck, and means associated with the connection between the pin, member, and truck whereby said truck is movable transversely of the pin axis.

3. An articulated train comprising a plurality of coaches in tandem relation, a car truck beneath the adjacent ends of a pair of said coaches, a member arranged for slidable movement on the truck, said member having a vertical opening therethrough having a reduced portion of varying diameter, a pivot pin receivable in said opening and adapted to rock on said reduced portion, and resilient means engaging each side of said member in opposed relation and tending to slidably locate said member and position the pin centrally of the truck whereby the relative sidewise movements of the coaches and truck will be cushioned.

4. In an articulated train comprising a plurality of coaches in tandem relation, a single car truck beneath the adjacent ends of a pair of coaches, a member supported by said truck, said member having a vertical opening therethrough having a reduced portion of varying diameter, a pivot pin receivable in said member and adapted to rock about said reduced portion, a connecting arm from one of said coaches, said arm having an opening therethrough in which said pin is adapted to tightly fit, a connecting arm from the other of said coaches, said second-mentioned arm having an opening therethrough, said opening having a reduced portion of varying diameter, said pin being receivable in said opening and adapted to rock about said reduced portion.

5. In an articulated train having a plurality of coaches in tandem relation, a car truck, a member laterally movable on the truck, arms laterally extending from said member, means supporting said arms on said truck, pivoted means supported by said member and pivotally interconnecting abutting coach ends, a plurality of coilable springs engageable with the opposite sides of said member and yieldably locating the pivotal means relative to the truck, and removable means fixed with respect to the truck and maintaining said springs positioned against said member.

CHARLES DE LOS RICE.